Jan. 1, 1929.  1,697,033
A. L. UMSCHEID
ELECTRIC CORD TAKE-UP
Filed Dec. 4, 1926
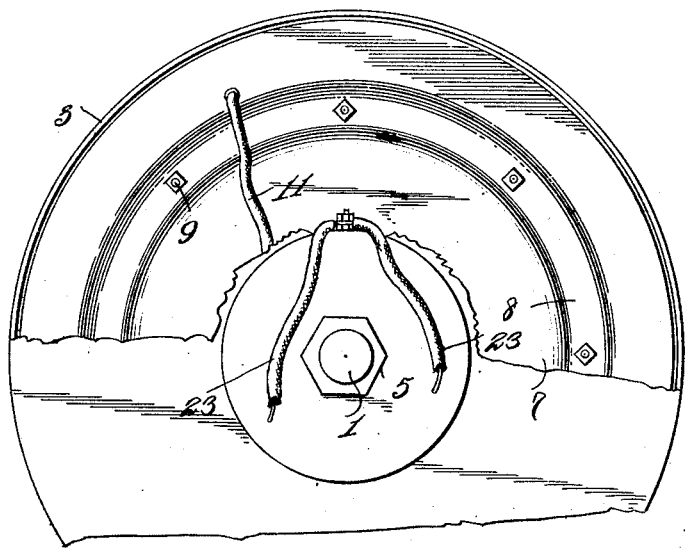
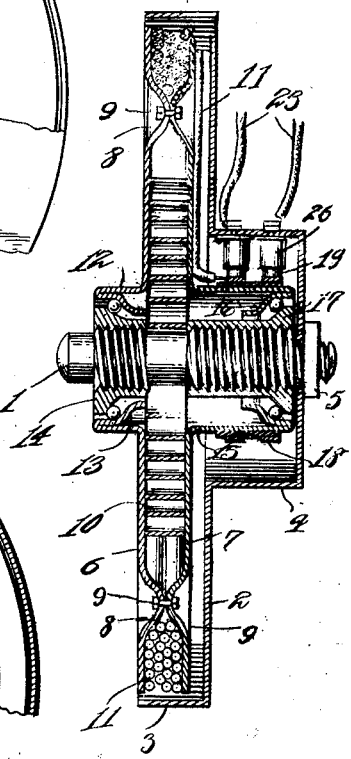
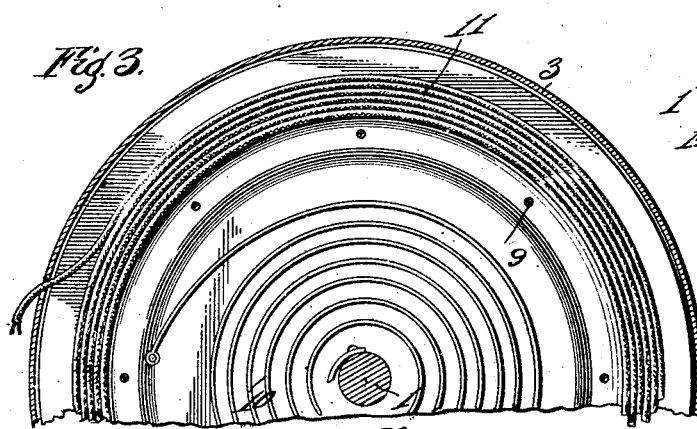
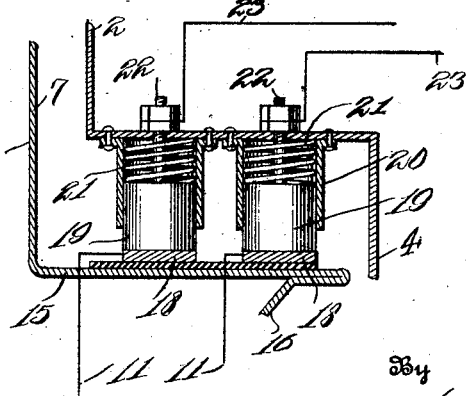
Inventor
A. L. Umscheid.
By Lacey & Lacey, Attorneys Patented Jan. 1, 1929.

1,697,033

UNITED STATES PATENT OFFICE.

ALOYSIUS L. UMSCHEID, OF ST. GEORGE, KANSAS.

ELECTRIC-CORD TAKE-UP.

Application filed December 4, 1926. Serial No. 152,687.

The invention provides means whereby to prevent slack in the electric conductor between portable fixtures and the service line and maintain the same taut at all times.

The primary purpose of the invention is the provision of simple and effective means, of the nature stated, which preserves the electric contact between the conductor and the source of current supply, yet admits of the lengthening and shortening of said conductor to prevent any objectionable slack when the electric fixture is moved from one place to another.

The invention contemplates a take up embodying a reel, a fixed mount for the reel including a rim extending over and closing the outer side of the reel and circuit closing means, comprising contact rings rotatable with the reel and having the strands of the electric conductor connected thereto, and brushes on the mount coacting with the said rings and having connection with the source of supply of electricity.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of an electric cord take up embodying the invention, parts being broken away.

Figure 2 is a vertical, central, transverse sectional view of the device.

Figure 3 is a fragmentary sectional view of the reel and a portion of the mount therefor.

Figure 4 is an enlarged detail sectional view of the circuit closing means.

Corresponding and like parts are referred to in the following description and designated in the several views of the drawings by like reference characters.

The device comprises a reel and a mount therefor, the latter including an axle 1 and a plate 2 which is secured to the axle. A rim 3 projects laterally from the outer edge of the plate 2 and extends across the open side of the reel to form a closure therefor. The middle portion of the plate 2 is pressed outwardly, as indicated at 4, to provide a housing for enclosing the circuit closing means. One end of the axle 1 is reduced and passes through an opening in the center of the housing 4, and is clamped against the shoulder, provided at the inner end of the reduced portion, by means of a nut 5. The mount is fixed and the reel is loose upon the axle 1 and is disposed within the space circumscribed by the rim 3.

The reel comprises complemental plates 6 and 7 which are spaced apart a determinate distance, each of the plates having an annular portion pressed laterally, as indicated at 8, said portions facing inwardly and being disposed in contact, as indicated most clearly in Figure 2, and secured by means of bolts 9 or other suitable fastening means. The several plates are of circular outline, and the laterally pressed portions of the plates 6 and 7 touch and divide the space formed between the plates into inner and outer portions, the inner space receiving a coil spring 10 which is made fast at its inner end to the axle 1 and at its outer end to the reel. The outer space receives the winds of the electric cord 11. The central portion of the plate 6 is apertured and is pressed outwardly in line with the opening to form a collar 12 and is pressed inwardly to form the cup 13 of a ball race. A cone 14 threaded upon an end of the axle 1 confines the balls of the anti-friction bearing provided between the plate 6 and the axle. The plate 7 is likewise formed with a central opening and has an outwardly disposed collar 15 in line with the opening, the outer portion of said collar being pressed inwardly to form the cup 16 of a ball race, a cone 17 threaded upon the axle 1 confining the balls of the anti-friction bearing.

Contact rings 18 are mounted upon the collar 15 and are electrically insulated from said collar and from each other and the strands 11 forming the electric cord are electrically connected to the rings 18, and pass through an opening in a side of the plate 7 adjacent the inwardly pressed portions 8 of the plates comprising the reel. A brush 19 cooperates with each of the contact rings 18 and is mounted in a guide 20 secured to the outer wall of the housing 4. A spring 21 within the guide 20 normally urges the brush 19 outwardly to maintain it in contact with the ring 18. A stem 22 projecting from each of the brushes 19 passes through the outer closed end of the guide 20 and is adapted to have a lead wire 23 connected thereto, said lead wire being coupled to a service line for supplying electricity in a manner well understood.

The electric cord 11 may be of any length and its strands are electrically connected to the contact rings 18 in the manner herein stated and the fixture or other article to be supplied with electricity has the outer end of the cord 11 connected thereto in a manner well understood. As the movable part, such as a lamp, iron, vacuum cleaner, or the like, is moved away from the take up, the cord 11 is unwound therefrom and winds the spring 10, said cord passing through an opening formed in the rim 3 of the plate 2. As the article is again moved towards the take up the reel is reversely rotated by the unwinding of the spring 10, thereby rewinding the cord 11 upon the reel and preventing the formation of any slack therein, which would otherwise occur if no means were provided for reverse rotation of the reel. It will thus be understood that the electric cord is maintained taut at all times, and the formation of any slack therein prevented. The take up may be used with electric drills, riveters and analogous portable machines.

Having thus described the invention, I claim:

An automatic take up comprising a mount including a plate having its outer portion pressed laterally to provide a rim and having its middle portion pressed laterally in an opposite direction to provide a housing, and an axle attached at one end to the center of said housing, a spring actuated reel mounted upon the axle within said rim and having a laterally disposed collar projecting within the said housing, electrically insulated contact rings mounted upon the collar of the reel, an electric cord adapted to wind upon the reel and having its strands electrically connected to said contact rings and brushes connected to the outer wall of said housing and coacting with the said contact rings.

In testimony whereof I affix my signature.

ALOYSIUS L. UMSCHEID. [L. S.]